United States Patent [19]

Cole et al.

[11] Patent Number: 5,030,591

[45] Date of Patent: Jul. 9, 1991

[54] HYDROCARBON ABSORBING COMPOSITIONS

[76] Inventors: James A. Cole, 2611 Alvey Dr., Haymarket, Va. 22069; Jerry C. Tripp, 11519 Lifting La., Fairfax Station, Va. 22039

[21] Appl. No.: 408,563

[22] Filed: Sep. 15, 1989

[51] Int. Cl.$^5$ ............................................. B01J 20/26
[52] U.S. Cl. ................................... 502/402; 210/679
[58] Field of Search ........................................ 502/402

[56] References Cited

U.S. PATENT DOCUMENTS

| | | | |
|---|---|---|---|
| 3,676,357 | 7/1972 | Cluti et al. | 502/402 |
| 4,072,794 | 2/1978 | Tomita et al. | 502/402 X |
| 4,206,080 | 6/1980 | Sato et al. | 502/402 X |
| 4,537,877 | 8/1985 | Ericsson | 502/402 |
| 4,720,397 | 1/1988 | O'Mara et al. | 427/180 |

*Primary Examiner*—Patrick P. Garvin

[57] ABSTRACT

A composition containing a particulate, absorbent solid and particles of a rapid-dissolving, high molecular weight polymer in admixture is used to soak up and hold hydrocarbons and other organic liquids. The polymer dissolves in the liquid being absorbed and tends to seal the liquid within the absorbent particles and to bind the particles together thus facilitating clean-up.

13 Claims, 1 Drawing Sheet

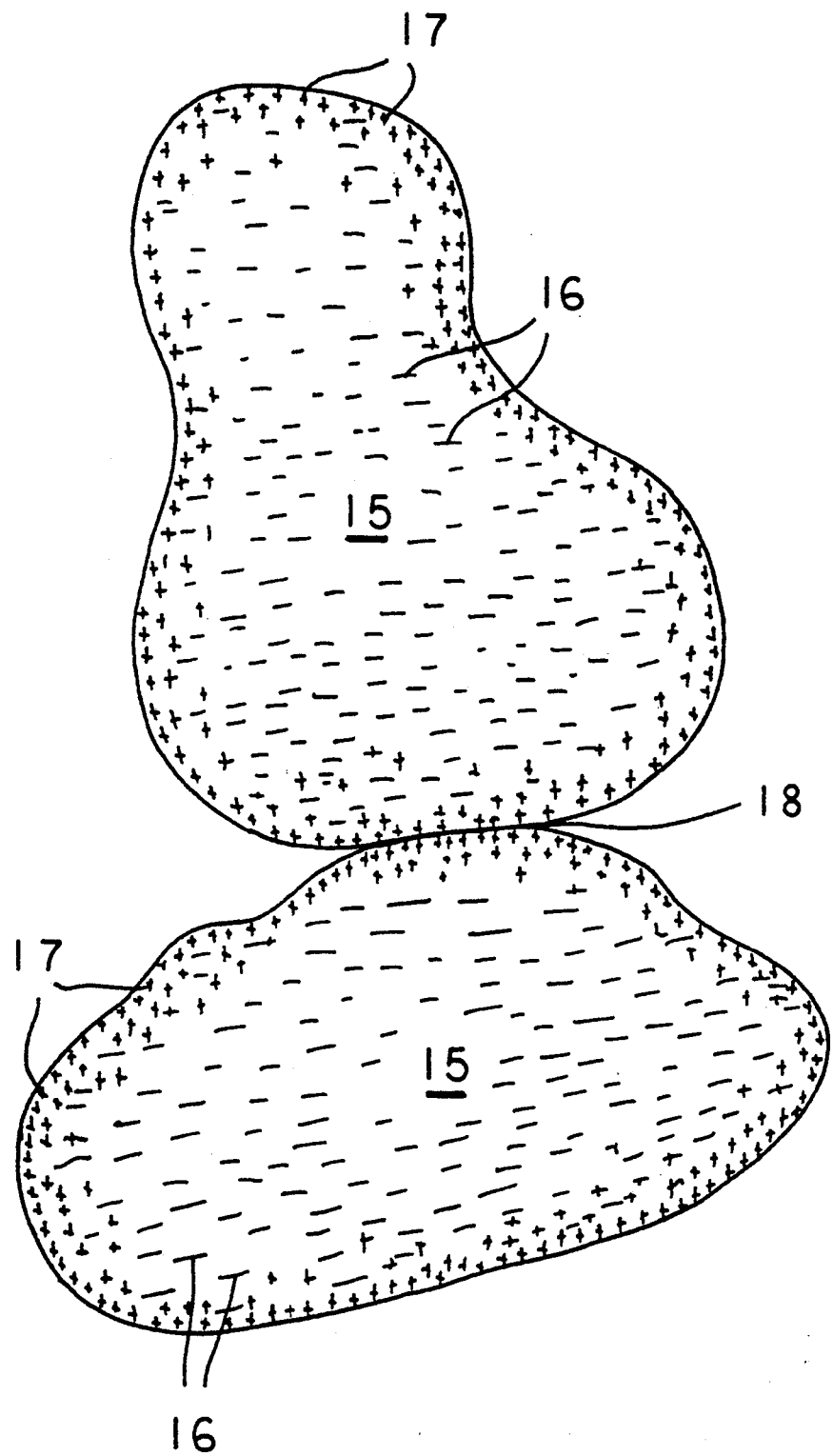

HYDROCARBON ABSORBING COMPOSITIONS

BACKGROUND OF THE INVENTION

1. Field of the Invention

This invention relates generally to absorbent compositions adapted to soak up and retain hydrocarbon liquids.

More specifically, this invention relates to admixtures of particulate solid absorbents with a high molecular weight, hydrocarbon soluble polymer, the mixture being formulated in a manner which allows the polymer to dissolve in the hydrocarbon liquid taken up in the sorbent and to retain the liquid therein.

2. Description of Related Art

A wide variety of organic and inorganic absorbents have been used to soak up oils and other spilled hydrocarbon liquids. Organic materials commonly used for this purpose include straw, wood pulp, saw dust, peanut shells, dried peat fibers, paper, and a variety of similar materials. Probably the most commonly used organic absorbent is saw dust as it has good absorption properties and is widely available at modest cost. Among commonly used inorganic absorbents are diatomaceous earth, expanded micas such as vermiculite, pumice, and similar porous materials.

It is also common to use adsorbents to capture and remove spilled oils and other hydrocarbons, particularly in those cases where the hydrocarbon liquid is associated with or floating on water. Adsorbent materials are distinguished from absorbent materials in that adsorption is a surface phenomenon in which hydrocarbon liquid taken up by the adsorbent material is distributed in film fashion over the surface of the adsorbing material. Absorption, in contrast, is the taking up of the liquid into the body of the solid absorbent material and is associated with the pore structure of the solid.

Adsorbent materials which have been commonly used for the capture of hydrocarbon liquids include fine plastic fibers such as polypropylene wool, a variety of natural fibers including cotton and other plant fibers, cellulose and the like, which have been rendered water repellent through use of a hydrophobic coating and even fine sand, clays and other solid inorganic materials.

One example of absorbent use for liquid hydrocarbon capture is set out in the Ericsson patent, U.S. Pat. No. 4,537,877. The absorbent described by Ericsson comprises a mixture of hydrophobic cellulose pulp fibers with an inorganic filler of the type conventionally used in paper manufacture. The cellulose fibers are rendered hydrophobic by conventional methods such as sizing with resins or prepolymers or by applying a thermoplastic polymer to the fibers by melting the thermoplastic material. According to the inventor, those absorbent compositions disclosed in the patent display a low explosion hazard and low flammability prior to use but, after absorption of oil, are readily flammable and are entirely consumed when burned leaving but a small ash residue.

Adsorbents used for liquid hydrocarbon capture are illustrated by a patent to Tomita et al, U.S. Pat. No. 4,072,794, and by a patent to Sato et al, U.S. Pat. No. 4,206,080. The Tomita et al patent describes an adsorbent which comprises double-coated natural fibers. Fibers useful in the described adsorbent include peat fibers, coconut husk fibers, jute, cotton, wool, hair and the like. The fibers are first coated with a paraffin emulsion and are then dried. In a second coating step, the paraffin-coated fibers are treated with a rubber latex which is thereafter cured to form an elastic rubber surface layer. The purpose of the rubber layer is to protect the paraffin layer and prevent its separation from the fiber or dissolution in the oil. The described compositions are said to provide advantages in that the composition floats on water for long periods of time while retaining its original form and without extraction of paraffin by the oil and the oil-loaded adsorbent burns without problem.

Sato et al describe an oil-adsorbing composition which comprises a granulated mixture of an inorganic filler material which adsorbs oil, the mixture bound together with a cross-linked, oleophilic polymer. The composition is manufactured by mixing and crushing the ingredients while cross-linking the polymer. Suitable polymers are those which are cross-linkable by action of heat or a cross-linking agent and include ethylenic polymers and rubbers. After cross-linking, such polymers ordinarily display little if any solubility in ordinary hydrocarbon solvents.

Both absorbent and adsorbent materials of the prior art tend to have a practical disadvantage. They tend to ooze liquid if loaded anywhere near capacity. The need for sorbent materials which overcome that drawback can readily be appreciated.

SUMMARY OF THE INVENTION

An absorbent composition is provided for soaking up and retaining organic liquids, particularly hydrocarbon liquids such as spilled oils and fuels. The composition includes a major amount of a solid absorbent in granular or particulate form in physical admixture with a minor amount of particles of a soluble high molecular weight polymer formulated in such a fashion as to be both rapid dissolving and non-agglomerating. Upon contact with an organic liquid, the polymer dissolves in the liquid while the liquid is being sorbed into the pores of the absorbent solid causing the polymer to be concentrated on and near the surface of the absorbent particles. The concentrated polymer layer tends to seal the sorbed liquid within the absorbent material and to adhesively bind the mass together. The absorbent composition may be used by spreading it in powder form on a liquid surface or it may be placed in fabric or other permeable containers shaped as pillows, pads, ropes, booms and the like which in turn are contacted with the organic liquid.

Hence, it is an object of this invention to provide means and methods for soaking up and retaining organic liquids.

It is a specific object of this invention to provide absorbent compositions adapted to soak up and retain organic liquids such as spilled oils and fuels.

Another specific object of this invention is to provide a method for capturing and recovering fugitive organic liquids.

BRIEF DESCRIPTION OF THE DRAWING

The sole FIGURE is a stylized illustration of particles of absorbent solid after contact with an organic liquid.

DETAILED DESCRIPTION OF THE INVENTION

This invention provides an absorbent composition and a method for its use. The composition must include a major amount of a particulate, fibrous or granulate absorbent solid in physical admixture with a smaller amount of a high molecular weight polymer which also must be in particulate form. There may optionally be included in the composition minor amounts of an adsorbent material, particularly a fibrous adsorbent material having wicking properties, such as polypropylene fiber, which is readily wet by organic liquids.

The absorbent solid may be any one of the commonly used organic and inorganic absorbents. For most applications, it is preferred that the absorbent be combustible so as to allow a disposal of the used composition by incineration. Appropriate combustible absorbents include organic materials such as straw, wood pulp, saw dust, ground corn cobs, dried peat fibers, and even puffed cereals. Of these materials, saw dust, ground corn cobs, and the like are preferred because those materials have good absorption properties and are widely available at low cost. Noncombustible absorbents suitable for use include diatomaceous earths, expanded micas, pumice, and other similar porous materials.

Polymers useful in the invention must be oil-soluble and must also be in the form of relatively finely divided particulates. Suitable polymers include natural and synthetic thermoplastics, typically rubbers, which impart viscoelastic properties to a solution. Exemplary polymers useful in a composition of the invention include polyisobutylene, polyisoprene, polybutadiene, and other rubbery polymers and copolymers. In all instances, the polymer used must be of sufficiently high molecular weight to impart viscoelasticity to a hydrocarbon liquid in which it is dissolved. As a practical matter, a polymer must have a molecular weight in excess of about 2.5 million in order to impart a useful degree of viscoelasticity to hydrocarbon solutions. Because viscoelasticity of a polymer solution increases as a an exponential function of polymer molecular weight, relatively small increases in polymer molecular weight provide disproportionately large increases in the viscoelasticity of the polymer solution. In general, as polymer molecular weight increases, the amount of polymer required to obtain an effective composition decreases.

As has been said before, the polymers used in the composition of this must be in a relatively finely divided particulate form. The size of the polymer particles is not critical but polymer particle size does affect the dissolving rate of the polymer in a solvent. In most applications, it is preferred that the largest polymer particles have a diameter less than about 1 millimeter and preferably less than about 0.5 millimeters. Those polymers useful in this invention generally display a surface tackiness at ordinary temperatures and the polymer particles, after grinding or comminution by other techniques, tend to reagglomerate and stick together upon contact. Consequently, it is extremely difficult to obtain a relatively uniform mixture of polymer particles with solid absorbents. That difficulty is, however, easily overcome by utilizing the rapid dissolving polymer compositions described in U.S. Pat. No. 4,720,397, the disclosure of which is incorporated by reference herein. As is described in that patent, a particulate, free-flowing and rapid dissolving polymer composition is prepared by comminuting a high molecular weight thermoplastic such as polyisobutylene at very low temperatures whereat the polymer is brittle. Polymer particles resulting from comminution are mixed with a solid particulate coating agent and mixing is continued while the temperature is raised to a level at which the polymers surfaces again become tacky. Any of those polymer compositions disclosed and described in U.S. Pat. No. 4,720,397 are appropriate for use in preparing the composition of this invention.

The compositions of this invention comprise a simple physical admixture of the polymer particles and a suitable solid absorbent. The compositions may be prepared either batch wise or continuously using a V Blender or other suitable mixer which provides a tumbling action. The ratio of polymer to absorbent can vary over a fairly broad range depending upon the molecular weight of the polymer and the composition of the absorbent solid used. Useful compositions are obtained at polymer levels ranging from about 2 to about 20 percent by weight of the total composition with the absorbent solid and, optionally, a wicking fiber such a polypropylene making up the balance. Particularly preferred compositions contain from about 5 to about 12 percent by weight polymer with a balance again being absorbent together with a small amount of wicking fiber if desired. The presence of wicking fiber in the composition tends to increase the rate at which a hydrocarbon liquid is adsorbed and also tends to increase the coherence of the oil saturated composition. For most applications, little advantage is obtained in increasing the wicking fiber loading beyond about 5 to 10 weight percent of the total composition.

As has been set out before, the composition can be prepared by simple tumble mixing of an absorbent such as saw dust with a polymer powder. The rough surfaces of the absorbent solids used tend to prevent settling and segregation of the two solid phases after mixing. The physically mixed composition does not segregate during storage or transportation and is stable in storage so long as it is maintained in a dry environment.

An appreciation for the way that the composition of this invention works when it contacts an organic liquid may be gained by reference to the Figure. The Figure depicts in a stylized view a cross section of a pair of absorbent solid particles 15 after they have come in contact with an organic liquid. When a hydrocarbon or other organic liquid contacts the composition, the polymer particles begin to dissolve in the liquid. At the same time, the organic liquid and the solution of polymer within the organic liquid is being absorbed into the particles of the absorbent solid. This process continues until the particles are saturated with liquid. The travel of the polymer solution from the surface of each absorbent particle to its interior produces a chromatographic effect. That is, the rate at which the relatively low molecular weight organic liquid penetrates into the absorbent particles is far greater than the penetration rate of the very high molecular weight polymer molecules. Thus, upon equilibrium, there is obtained an essentially uniform distribution of the organic liquid, depicted as short horizontal lines 16 in the drawing, throughout the particles of absorbent solids. On the other hand, polymer molecules represented by cross-marks 17 are concentrated on and near the surfaces of the absorbent solid particles. As a result, the absorbed liquid within each solid particle tends to be locked in the composition by the concentrated polymer solution. Relatively concentrated solutions of polymer in a solvent display a very high degree of tackiness and act as an adhesive. In fact, solutions of high molecular weight polyisobutylene and similar rubbery polymers are used as commercial adhesives. Thus, adjacent absorbent particles are bound together at points of contact 18 by the adhesive effect of the concentrated polymer coating on the surface of the particles.

The absorbent compositions of this invention may be used to trap and contain spilled organic liquids by spreading the powder on the liquid surface. That may be done in any convenient manner either by hand application or using any of a variety of commercially available powder dispensing devices. Absorption of organic liquids into the composition is very rapid and is ordinarily complete within a minute or two after contact. Only enough of the absorbent composition need be applied to soak up free liquid. The liquid saturated absorbent composition may then be collected by mechanically raking the material from the surface affected by the spill, loaded into suitable containers, and removed from the site for disposal. The liquid saturated absorbent displays a high degree of cohesiveness and, even though it was applied in particulate form, may be removed in large masses using forks and similar tools.

In addition to application of the composition as a powder, it may be formed into pads, pillows, and booms by using the composition as a filling for appropriately shaped fabric enclosures. Appropriate fabrics to use for this purpose include open weave nylons and the like which are readily permeable to organic liquids. The pads and pillows may be used to soak up spilled hydrocarbons and other liquids or may be used to catch drippings from machinery and the like. Booms may be formed as continuous fabric tubes and may be used for stemming the flow or containing the spill of hydrocarbons and like fluids on land. Such booms may also consist of a manifolded tube form consisting of several parallel connected tubes to facilitate the dyking absorption of heavy liquid spills.

Liquid saturated, or spent, absorbent can readily be disposed of by burning. When used for absorbing diesel fuel and similar hydrocarbons, a saw dust based absorbent burns readily with little smoke and essentially no ash. When a noncombustible material such as diatomaceous earth is used as the absorbent solid, incineration may also be used for disposal but the amount of ash remaining is quite large.

The following examples serve to more fully illustrate the invention and to set out certain preferred embodiments thereof.

EXAMPLE 1

A quantity of a particulate rapid dissolve composition was prepared in the manner described in U.S. Pat. No. 4,720,397. The polymer used was polyisobutylene having a molecular weight above about 5 million. Finely divided, dry calcium stearate was used as the polymer coating agent and the weight ratio of polymer to coating agent was about 4 to 1. The polymer composition was mixed with saw dust to form a blend containing 8.6% by weight of the polymer composition with the balance being saw dust. Mixing was carried out in a V-Blender.

A "Paint Filter" test was performed on a portion of the prepared composition. That test is commonly used to quantify the capacity of an absorbent to stably hold a liquid. Two hundred fifty milliliters of diesel fuel was mixed with 85 grams of the prepared composition. A 100 gram portion of that mixture was placed in a conical paper filter held by a filter funnel. A beaker was placed beneath the funnel to catch any liquid dripping from the filter. No liquid escaped the filter into the beaker during the first hour after addition of the diesel fuel to the absorbent. The beaker was checked again at 3½ hours and no leakage had occurred at that time. The test was continued for four days with no release of diesel fuel from the absorbent composition being observed. At the end of that time, the experiment was terminated.

EXAMPLE 2

The procedure of example 1 was repeated except that saw dust alone, rather than the saw dust polymer composition of this invention, was used as the absorbent material. Again, 85 grams of saw dust was mixed with 250 milliliters of diesel fuel and 100 grams of that mixture was placed in a filter. At the end of five minutes, 12 milliliters of diesel fuel had gone through the filter and collected in the beaker.

EXAMPLE 3

The procedure of example 1 was repeated except that 300 milliliters of diesel fuel, rather than the 250 milliliters used in example 1, was mixed with 85 grams of the polymer saw dust composition of this invention. No diesel fuel escaped through the filter in the first five minutes.

The experiment was repeated using 350 milliliters of diesel fuel. Again, no diesel fuel leaked from the filter during the first five minutes.

The above examples and teachings have been set out to illustrate certain preferred compositions and to describe their use. Many modifications and variations of the present invention will be evident to those skilled in the art in light of those teachings. The data and observations presented therein are not to be construed as limiting the scope of the inventive compositions nor their uses.

We claim:

1. A composition for absorbing organic liquids comprising a major amount of a particulate, absorbent solid and a minor amount of a relatively finely divided polymer in physical admixture, said polymer being soluble in said organic liquids and having a molecular weight sufficiently high to impart viscoelasticity to a solution of said polymer in said organic liquids.

2. The composition of claim 1 wherein the amount of said polymer in the composition is in the range of 2% to 20% by weight.

3. The composition of claim 2 including a minor amount of wicking fibers.

4. The composition of claim 3 wherein said wicking fibers are polypropylene fibers in an amount less than 10% by weight of the composition.

5. The composition of claim 2 wherein said polymer is a rubbery thermoplastic polymer having a molecular weight above 2.5 million.

6. The composition of claim 1 wherein said absorbent solid is combustible.

7. The composition of claim 6 wherein said combustible absorbent solid is selected from the group consisting of saw dust, wood pulp, ground corn cobs and granulated peat fibers.

8. The composition of claim 1 wherein said absorbent is noncombustible.

9. The composition of claim 8 wherein said noncombustible absorbent is selected from the group consisting of diatomaceous earth, expanded micas and pumice.

10. The composition of claim 1 wherein the median particle diameter of said polymer is less than 1 millimeter and wherein individual polymer particles have a covering of a solid, particulate coating agent.

11. The composition of claim 10 wherein the amount of said polymer in the composition is in the range of about 5% to about 12% by weight and wherein said absorbent solid is combustible.

12. The composition of claim 11 wherein said polymer is polyisobutylene.

13. The composition of claim 12 wherein said polyisobutylene has a molecular weight above about 5 million and wherein said absorbent solid is saw dust.

* * * * *